US012689849B2

(12) United States Patent
Lefevre et al.

(10) Patent No.: US 12,689,849 B2
(45) Date of Patent: Jul. 21, 2026

(54) SUPPORTING COMMUNICATIONS IN OPTICAL COMMUNICATION SYSTEMS

(71) Applicant: Nokia Solutions and Networks Oy, Espoo (FI)

(72) Inventors: Yannick Lefevre, Heverlee (BE); Amitkumar Mahadevan, Edison, NJ (US); Werner Van Hoof, Aartselaar (BE)

(73) Assignee: Nokia Solutions and Networks Oy, Espoo (FI)

( * ) Notice: Subject to any disclaimer, the term of this patent is extended or adjusted under 35 U.S.C. 154(b) by 275 days.

(21) Appl. No.: 18/478,951

(22) Filed: Sep. 29, 2023

(65) Prior Publication Data
US 2025/0113126 A1 Apr. 3, 2025

(51) Int. Cl.
| | |
|---|---|
| *H04B 10/00* | (2013.01) |
| *H04J 14/02* | (2006.01) |
| *H04Q 11/00* | (2006.01) |
| *H04J 14/00* | (2006.01) |

(52) U.S. Cl.
CPC ...... *H04Q 11/0067* (2013.01); *H04J 14/0246* (2013.01); *H04Q 2011/0064* (2013.01); *H04Q 2011/0079* (2013.01)

(58) Field of Classification Search
CPC .................................................... H04B 10/272
See application file for complete search history.

(56) References Cited

U.S. PATENT DOCUMENTS

2019/0141422 A1* 5/2019 Wu ..................... H04L 12/2885

OTHER PUBLICATIONS

International Telecommunication Union, ITU-T Telecommunication Standardization Sector of ITU, G.9804.1, Amendment 1, (Aug. 2021) Series G: Transmission Systems and Media, Digital Systems and Networks, Access networks—Optical line systems for local and access networks, Higher speed passive optical networks—Requirements, Amendment 1, Recommendation ITU-T G.9804.1 (2019)—Amendment 1, 70 pages.
International Telecommunication Union, Standardization Sector, Recommendation, ITU-T G.9804.2 (2021) Amd. 1 (Feb. 2023) Series G: Transmission Systems and Media, Digital Systems and Networks, Access networks—Optical line systems for local and access networks, Higher speed passive optical networks—Common transmission convergence layer specification, Amendment 1, document consists of 266 pages (divided into 4 attachments herein).

(Continued)

*Primary Examiner* — Daniel G Dobson
(74) *Attorney, Agent, or Firm* — Tong, Rea, Bentley & Panagos, LLC

(57) ABSTRACT
Various example embodiments for supporting optical communications in an optical communication system are presented herein. Various example embodiments for supporting optical communications in an optical communication system may be configured to support optical communications within a passive optical network (PON) including an optical line terminal (OLT) and an optical network unit (ONU) where communications between the OLT and the ONU is supported based on support for multiple ONU instances of the ONU within the PON.

20 Claims, 7 Drawing Sheets

PASSIVE OPTICAL NETWORK
100

(56) References Cited

OTHER PUBLICATIONS

International Telecommunication Union, TU-T Telecommunication Standardization Sector of ITU, G.9804.3, (Sep. 2021), Series G: Transmission Systems and Media, Digital Systems and Networks Access networks—Optical line systems for local and access networks, 50-Gigabit-capable passive optical networks (50G-PON): Physical media dependent (PMD) layer specification, Recommendation ITU-T G.9804.3, 50 pages.

Khotimsky, et al., "Bandwidth Allocation and Allocation Identifiers in G.hsp.ComTC," ITU Draft, Telecommunication Standardization Sector, Ad Hoc Moderator, Study Period of 2017-2020, Conference Call held on Feb. 12, 2021, dated Mar. 5, 2021, 15 pages.

Van Hoof et al., "G.hsp.comTC; suggested text for Section 6; Cn," ITU-T Draft, Telecommunication Standardization Sector, Study Group 15 (SG15-Cn), Study Period of 2017-2020, Teleconference on Jun. 9, 2020, dated Sep. 5, 2022, 17 pages.

Wu et al., "WDM PON. TC & PMD: PLOAM message for WDM PON," ITU-T Draft, Telecommunication Standardization Sector, Huawei Technologies Co. Ltd., China Telecommunications Corporation; Study Period of 2022-2024, Group 15, Geneva, Sep. 19-30, 2022, dated Sep. 5, 2022, 18 pages.

Extended European Search Report, Application No. 24202123.6-1206, dated Feb. 26, 2025, 12 pages.

\* cited by examiner

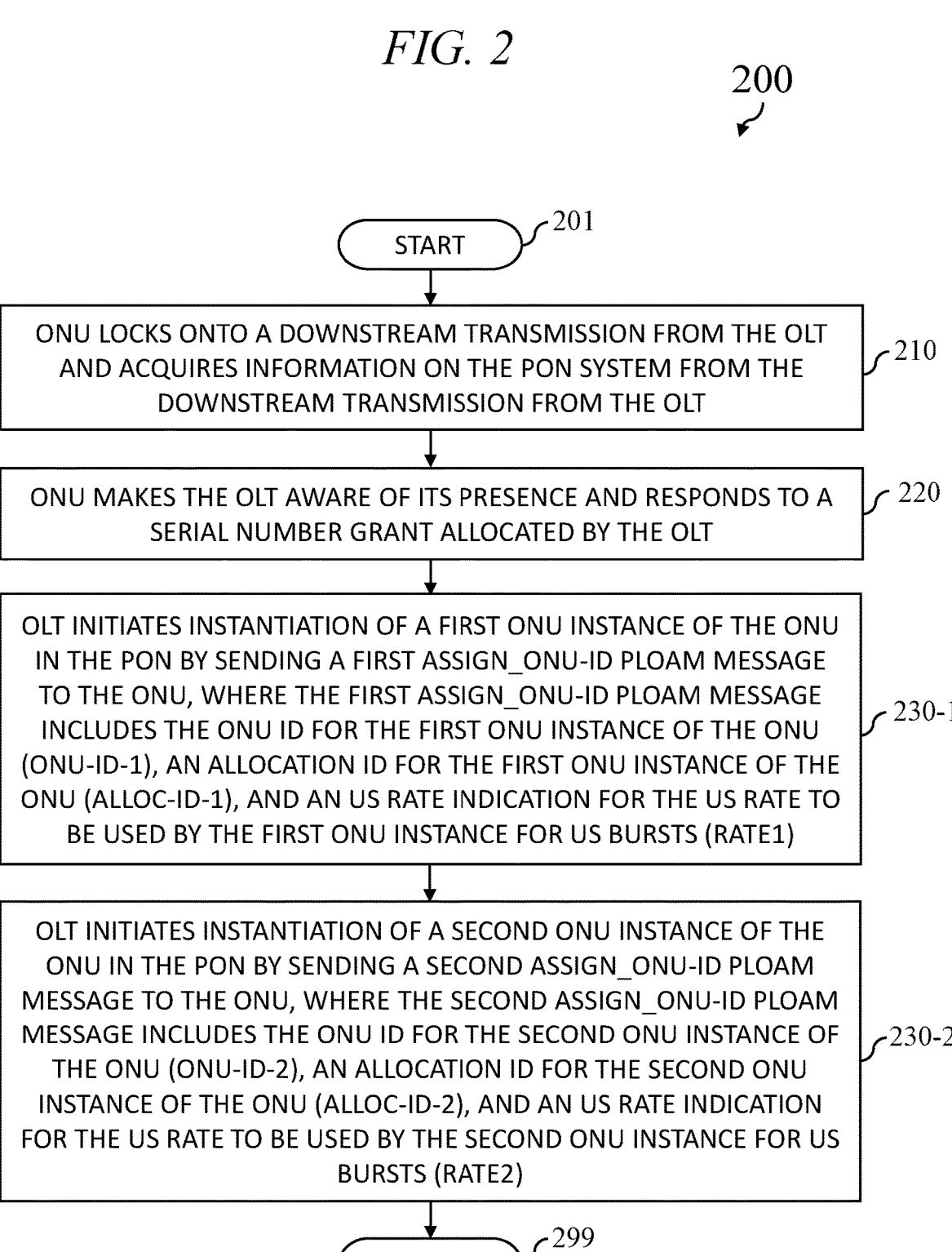

START — 201

ONU LOCKS ONTO A DOWNSTREAM TRANSMISSION FROM THE OLT AND ACQUIRES INFORMATION ON THE PON SYSTEM FROM THE DOWNSTREAM TRANSMISSION FROM THE OLT — 210

ONU MAKES THE OLT AWARE OF ITS PRESENCE AND RESPONDS TO A SERIAL NUMBER GRANT ALLOCATED BY THE OLT — 220

OLT INITIATES INSTANTIATION OF A FIRST ONU INSTANCE OF THE ONU IN THE PON BY SENDING A FIRST ASSIGN_ONU-ID PLOAM MESSAGE TO THE ONU, WHERE THE FIRST ASSIGN_ONU-ID PLOAM MESSAGE INCLUDES THE ONU ID FOR THE FIRST ONU INSTANCE OF THE ONU (ONU-ID-1), AN ALLOCATION ID FOR THE FIRST ONU INSTANCE OF THE ONU (ALLOC-ID-1), AND AN US RATE INDICATION FOR THE US RATE TO BE USED BY THE FIRST ONU INSTANCE FOR US BURSTS (RATE1) — 230-1

OLT INITIATES INSTANTIATION OF A SECOND ONU INSTANCE OF THE ONU IN THE PON BY SENDING A SECOND ASSIGN_ONU-ID PLOAM MESSAGE TO THE ONU, WHERE THE SECOND ASSIGN_ONU-ID PLOAM MESSAGE INCLUDES THE ONU ID FOR THE SECOND ONU INSTANCE OF THE ONU (ONU-ID-2), AN ALLOCATION ID FOR THE SECOND ONU INSTANCE OF THE ONU (ALLOC-ID-2), AND AN US RATE INDICATION FOR THE US RATE TO BE USED BY THE SECOND ONU INSTANCE FOR US BURSTS (RATE2) — 230-2

END — 299

OPTICAL NETWORK UNIT
300

```
( START )─501
```

SUPPORT, BY AN OPTICAL NETWORK UNIT (ONU), A SET OF ONU INSTANCES OF THE ONU INCLUDING AT LEAST A FIRST ONU INSTANCE OF THE ONU AND A SECOND ONU INSTANCE OF THE ONU, WHEREIN THE ONU INSTANCES IN THE SET OF ONU INSTANCES ARE ACTIVE CONCURRENTLY AT THE ONU, WHEREIN THE FIRST ONU INSTANCE OF THE ONU HAS ASSIGNED THERETO A FIRST ALLOCATION IDENTIFIER AND SUPPORTS A FIRST SET OF UPSTREAM COMMUNICATION SETTINGS, WHEREIN THE SECOND ONU INSTANCE OF THE ONU HAS ASSIGNED THERETO A SECOND ALLOCATION IDENTIFIER DIFFERENT THAN THE FIRST ALLOCATION IDENTIFIER AND SUPPORTS A SECOND SET OF UPSTREAM COMMUNICATION SETTINGS DIFFERENT THAN THE FIRST SET OF UPSTREAM COMMUNICATION SETTINGS ─510

SUPPORT, BY THE ONU BASED ON THE SET OF ONU INSTANCES OF THE ONU, UPSTREAM COMMUNICATIONS FROM THE ONU TO AN OPTICAL LINE TERMINAL (OLT) ─520

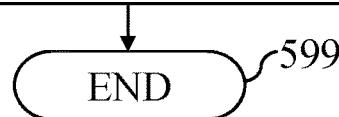

( END )─599

START ⟩⟋601

SUPPORT, BY AN OPTICAL LINE TERMINAL (OLT) FOR AN OPTICAL NETWORK UNIT (ONU), A SET OF ONU INSTANCES OF THE ONU INCLUDING AT LEAST A FIRST ONU INSTANCE OF THE ONU AND A SECOND ONU INSTANCE OF THE ONU, WHEREIN THE ONU INSTANCES IN THE SET OF ONU INSTANCES ARE ACTIVE CONCURRENTLY FOR THE ONU, WHEREIN THE FIRST ONU INSTANCE OF THE ONU HAS ASSIGNED THERETO A FIRST ALLOCATION IDENTIFIER AND SUPPORTS A FIRST SET OF UPSTREAM COMMUNICATION SETTINGS, WHEREIN THE SECOND ONU INSTANCE OF THE ONU HAS ASSIGNED THERETO A SECOND ALLOCATION IDENTIFIER DIFFERENT THAN THE FIRST ALLOCATION IDENTIFIER AND SUPPORTS A SECOND SET OF UPSTREAM COMMUNICATION SETTINGS DIFFERENT THAN THE FIRST SET OF UPSTREAM COMMUNICATION SETTINGS ⟋610

SUPPORT, BY THE OLT BASED ON THE SET OF ONU INSTANCES OF THE ONU, UPSTREAM COMMUNICATIONS FROM THE ONU TO THE OLT ⟋620

END ⟩⟋699

SUPPORTING COMMUNICATIONS IN OPTICAL COMMUNICATION SYSTEMS

TECHNICAL FIELD

Various example embodiments relate generally to optical communication systems and, more particularly but not exclusively, to supporting communications in passive optical networks (PONs).

BACKGROUND

Various communications technologies may be used to support communications in various types of communication systems.

SUMMARY

In at least some example embodiments, an apparatus includes at least one processor and at least one memory including instructions which, when executed by the at least one processor, cause the apparatus at least to support, by an optical network unit (ONU), a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and support, by the ONU based on the set of ONU instances of the ONU, upstream communications from the ONU to an optical line terminal (OLT). In at least some example embodiments, the first ONU instance has a first ONU identifier associated therewith, and the second ONU instance has a second ONU identifier associated therewith. In at least some example embodiments, at least one of the first set of upstream communication settings includes a first upstream transmission rate and the second set of upstream communication settings includes a second upstream transmission rate different than the first upstream transmission rate, or the first set of upstream communication settings includes a first forward error correction code and the second set of upstream communication settings includes a second forward error correction code different than the first forward error correction code. In at least some example embodiments, to support the set of ONU instances of the ONU, the instructions, when executed by the at least one processor, cause the apparatus at least to instantiate the first ONU instance based on a first set of control messages from the OLT, wherein the first set of control messages indicates a first ONU identifier indicative of the first allocation identifier and indicates the first set of upstream communication settings, and instantiate the second ONU instance based on a second set of control messages from the OLT, wherein the second set of control messages indicates a second ONU identifier indicative of the second allocation identifier and indicates the second set of upstream communication settings. In at least some example embodiments, to support the upstream communications from the ONU to the OLT, the instructions, when executed by the at least one processor, cause the apparatus at least to switch between use of the first ONU instance and the second ONU instance from upstream burst to upstream burst. In at least some example embodiments, to support the upstream communications from the ONU to the OLT, the instructions, when executed by the at least one processor, cause the apparatus at least to receive, by the ONU from the OLT, scheduling information for an upstream burst to be sent by the ONU, wherein the scheduling information is indicative that the first instance of the ONU is to be used for the upstream burst to be sent by the ONU, generate, by the ONU based on the first set of upstream communication settings of the first instance of the ONU, a burst signal, and transmit, by the ONU toward the OLT, the burst signal. In at least some example embodiments, to generate the burst signal, the instructions, when executed by the at least one processor, cause the apparatus at least to receive upstream data from a data queue, encapsulate the upstream data, generate a header for the upstream data, wherein the header includes an ONU identifier of the first instance of the ONU, associate the header with the upstream data to form an upstream data frame, and generate the burst signal from the upstream data frame. In at least some example embodiments, to support the upstream communications from the ONU to the OLT, the instructions, when executed by the at least one processor, cause the apparatus at least to support, by the ONU, bonding of the upstream communication of the first ONU instance and the upstream communication of the second ONU instance. In at least some example embodiments, the instructions, when executed by the at least one processor, cause the apparatus at least to support, by the ONU based on the set of ONU instances of the ONU, downstream communications from the OLT to the ONU. In at least some example embodiments, the set of ONU instances operates on the same wavelength.

In at least some example embodiments, a non-transitory computer-readable medium stores computer program instructions which, when executed by an apparatus, cause the apparatus at least to support, by an optical network unit (ONU), a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and support, by the ONU based on the set of ONU instances of the ONU, upstream communications from the ONU to an optical line terminal (OLT). In at least some example embodiments, the first ONU instance has a first ONU identifier associated therewith, and the second ONU instance has a second ONU identifier associated therewith. In at least some example embodiments, at least one of the first set of upstream communication settings includes a first upstream transmission rate and the second set of upstream communication settings includes a second upstream transmission rate different than the first upstream transmission rate, or the first set of upstream communication settings includes a first forward error correction code and the second set of upstream communication settings includes a second forward error correction code different than the first forward error correction code. In at least some example embodiments, to support the set of ONU instances of the ONU, the computer program instructions, when executed by the apparatus, cause the apparatus at least to instantiate the first ONU instance based on a first set of control messages from the OLT, wherein the first set of control messages indicates a first ONU identifier indicative of the first allocation identifier and indicates the first set of upstream communication settings, and instantiate the second ONU instance based on a second set of control messages from the OLT, wherein the second set of control messages indicates a second ONU identifier indicative of the second allocation identifier and indicates the second set of upstream communication settings. In at least some example embodiments, to support the upstream communications from the ONU to the OLT, the computer program instructions, when executed by the apparatus, cause the apparatus at least to switch between use of the first ONU instance and the second ONU instance from upstream burst to upstream burst. In at least some example embodiments, to support the upstream communications from the ONU to the OLT, the computer program instructions, when executed by the apparatus, cause the apparatus at least to receive, by the ONU from the OLT, scheduling information for an upstream burst to be sent by the ONU, wherein the scheduling information is indicative that the first instance of the ONU is to be used for the upstream burst to be sent by the ONU, generate, by the ONU based on the first set of upstream communication settings of the first instance of the ONU, a burst signal, and transmit, by the ONU toward the OLT, the burst signal. In at least some example embodiments, to generate the burst signal, the computer program instructions, when executed by the apparatus, cause the apparatus at least to receive upstream data from a data queue, encapsulate the upstream data, generate a header for the upstream data, wherein the header includes an ONU identifier of the first instance of the ONU, associate the header with the upstream data to form an upstream data frame, and generate the burst signal from the upstream data frame. In at least some example embodiments, to support the upstream communications from the ONU to the OLT, the computer program instructions, when executed by the apparatus, cause the apparatus at least to support, by the ONU, bonding of the upstream communication of the first ONU instance and the upstream communication of the second ONU instance. In at least some example embodiments, the computer program instructions, when executed by the apparatus, cause the apparatus at least to support, by the ONU based on the set of ONU instances of the ONU, downstream communications from the OLT to the ONU. In at least some example embodiments, the set of ONU instances operates on the same wavelength.

In at least some example embodiments, a method includes supporting, by an optical network unit (ONU), a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and supporting, by the ONU based on the set of ONU instances of the ONU, upstream communications from the ONU to an optical line terminal (OLT). In at least some example embodiments, the first ONU instance has a first ONU identifier associated therewith, and the second ONU instance has a second ONU identifier associated therewith. In at least some example embodiments, at least one of the first set of upstream communication settings includes a first upstream transmission rate and the second set of upstream communication settings includes a second upstream transmission rate different than the first upstream transmission rate, or the first set of upstream communication settings includes a first forward error correction code and the second set of upstream communication settings includes a second forward error correction code different than the first forward error correction code. In at least some example embodiments, supporting the set of ONU instances of the ONU includes instantiating the first ONU instance based on a first set of control messages from the OLT, wherein the first set of control messages indicates a first ONU identifier indicative of the first allocation identifier and indicates the first set of upstream communication settings, and instantiating the second ONU instance based on a second set of control messages from the OLT, wherein the second set of control messages indicates a second ONU identifier indicative of the second allocation identifier and indicates the second set of upstream communication settings. In at least some example embodiments, supporting the upstream communications from the ONU to the OLT includes switching between use of the first ONU instance and the second ONU instance from upstream burst to upstream burst. In at least some example embodiments, supporting the upstream communications from the ONU to the OLT includes receiving, by the ONU from the OLT, scheduling information for an upstream burst to be sent by the ONU, wherein the scheduling information is indicative that the first instance of the ONU is to be used for the upstream burst to be sent by the ONU, generating, by the ONU based on the first set of upstream communication settings of the first instance of the ONU, a burst signal, and transmitting, by the ONU toward the OLT, the burst signal. In at least some example embodiments, generating the burst signal includes receiving upstream data from a data queue, encapsulating the upstream data, generating a header for the upstream data, wherein the header includes an ONU identifier of the first instance of the ONU, associating the header with the upstream data to form an upstream data frame, and generating the burst signal from the upstream data frame. In at least some example embodiments, supporting the upstream communications from the ONU to the OLT includes supporting, by the ONU, bonding of the upstream communication of the first ONU instance and the upstream communication of the second ONU instance. In at least some example embodiments, the method includes supporting, by the ONU based on the set of ONU instances of the ONU, downstream communications from the OLT to the ONU. In at least some example embodiments, the set of ONU instances operates on the same wavelength.

In at least some example embodiments, an apparatus includes means for supporting, by an optical network unit (ONU), a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and means for supporting, by the ONU based on the set of ONU instances of the ONU, upstream communications from the ONU to an optical line terminal (OLT). In at least some example embodiments, the first ONU instance has a first ONU identifier associated therewith, and the second ONU instance has a second ONU identifier associated therewith. In at least some example embodiments, at least one of the first set of upstream communication settings includes a first upstream transmission rate and the second set of upstream communication settings includes a second upstream transmission rate different than the first upstream transmission rate, or the first set of upstream communication settings includes a first forward error correction code and the second set of upstream communication settings includes a second forward error correction code different than the first forward error correction code. In at least some example embodiments, the means for supporting the set of ONU instances of the ONU includes means for instantiating the first ONU instance based on a first set of control messages from the OLT, wherein the first set of control messages indicates a first ONU identifier indicative of the first allocation identifier and indicates the first set of upstream communication settings, and means for instantiating the second ONU instance based on a second set of control messages from the OLT, wherein the second set of control messages indicates a second ONU identifier indicative of the second allocation identifier and indicates the second set of upstream communication settings. In at least some example embodiments, the means for supporting the upstream communications from the ONU to the OLT includes means for switching between use of the first ONU instance and the second ONU instance from upstream burst to upstream burst. In at least some example embodiments, the means for supporting the upstream communications from the ONU to the OLT includes means for receiving, by the ONU from the OLT, scheduling information for an upstream burst to be sent by the ONU, wherein the scheduling information is indicative that the first instance of the ONU is to be used for the upstream burst to be sent by the ONU, means for generating, by the ONU based on the first set of upstream communication settings of the first instance of the ONU, a burst signal, and means for transmitting, by the ONU toward the OLT, the burst signal. In at least some example embodiments, the means for generating the burst signal includes means for receiving upstream data from a data queue, means for encapsulating the upstream data, means for generating a header for the upstream data, wherein the header includes an ONU identifier of the first instance of the ONU, means for associating the header with the upstream data to form an upstream data frame, and means for generating the burst signal from the upstream data frame. In at least some example embodiments, the means for supporting the upstream communications from the ONU to the OLT includes means for supporting, by the ONU, bonding of the upstream communication of the first ONU instance and the upstream communication of the second ONU instance. In at least some example embodiments, the apparatus includes means for supporting, by the ONU based on the set of ONU instances of the ONU, downstream communications from the OLT to the ONU. In at least some example embodiments, the set of ONU instances operates on the same wavelength.

In at least some example embodiments, an apparatus includes at least one processor and at least one memory including instructions which, when executed by the at least one processor, cause the apparatus at least to support, by an optical line terminal (OLT) for an optical network unit (ONU), a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and support, by the OLT based on the set of ONU instances of the ONU, upstream communications from the ONU to the OLT. In at least some example embodiments, the first ONU instance has a first ONU identifier associated therewith, and the second ONU instance has a second ONU identifier associated therewith. In at least some example embodiments, to support the set of ONU instances of the ONU, the instructions, when executed by the at least one processor, cause the apparatus at least to send, from the OLT toward the ONU, a first set of control messages indicating a first ONU identifier indicative of the first allocation identifier and indicating the first set of upstream communication settings, and send, from the OLT toward the ONU, a second set of control messages indicating a second ONU identifier indicative of the second allocation identifier and indicating the second set of upstream communication settings. In at least some example embodiments, the instructions, when executed by the at least one processor, cause the apparatus at least to allocate a burst grant to the ONU by allocating the burst grant to the first ONU instance or the second ONU instance. In at least some example embodiments, the instructions, when executed by the at least one processor, cause the apparatus at least to determine a condition associated with the ONU, and allocate a burst grant to the ONU by allocating the burst grant to the first ONU instance or the second ONU instance based on the condition associated with the ONU. In at least some example embodiments, to support the upstream communications from the ONU to the OLT, the instructions, when executed by the at least one processor, cause the apparatus at least to support, by the OLT, bonding of the upstream communication of the first ONU instance and the upstream communication of the second ONU instance such that, for a traffic flow of the ONU, packets of the traffic flow sent based on the first ONU instance and packets of the traffic flow sent based on the second ONU instance are directed to a common reassembly queue. In at least some example embodiments, the instructions, when executed by the at least one processor, cause the apparatus at least to support, by the OLT based on the set of ONU instances of the ONU, downstream communications from the OLT to the ONU. In at least some example embodiments, the set of ONU instances operates on the same wavelength.

In at least some example embodiments, a non-transitory computer-readable medium stores computer program instructions which, when executed by an apparatus, cause the apparatus at least to support, by an optical line terminal (OLT) for an optical network unit (ONU), a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and support, by the OLT based on the set of ONU instances of the ONU, upstream communications from the ONU to the OLT. In at least some example embodiments, the first ONU instance has a first ONU identifier associated therewith, and the second ONU instance has a second ONU identifier associated therewith. In at least some example embodiments, to support the set of ONU instances of the ONU, the computer program instructions, when executed by the apparatus, cause the apparatus at least to send, from the OLT toward the ONU, a first set of control messages indicating a first ONU identifier indicative of the first allocation identifier and indicating the first set of upstream communication settings, and send, from the OLT toward the ONU, a second set of control messages indicating a second ONU identifier indicative of the second allocation identifier and indicating the second set of upstream communication settings. In at least some example embodiments, the computer program instructions, when executed by the apparatus, cause the apparatus at least to allocate a burst grant to the ONU by allocating the burst grant to the first ONU instance or the second ONU instance. In at least some example embodiments, the computer program instructions, when executed by the apparatus, cause the apparatus at least to determine a condition associated with the ONU, and allocate a burst grant to the ONU by allocating the burst grant to the first ONU instance or the second ONU instance based on the condition associated with the ONU. In at least some example embodiments, to support the upstream communications from the ONU to the OLT, the computer program instructions, when executed by the apparatus, cause the apparatus at least to support, by the OLT, bonding of the upstream communication of the first ONU instance and the upstream communication of the second ONU instance such that, for a traffic flow of the ONU, packets of the traffic flow sent based on the first ONU instance and packets of the traffic flow sent based on the second ONU instance are directed to a common reassembly queue. In at least some example embodiments, the computer program instructions, when executed by the apparatus, cause the apparatus at least to support, by the OLT based on the set of ONU instances of the ONU, downstream communications from the OLT to the ONU. In at least some example embodiments, the set of ONU instances operates on the same wavelength.

In at least some example embodiments, a method includes supporting, by an optical line terminal (OLT) for an optical network unit (ONU), a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and supporting, by the OLT based on the set of ONU instances of the ONU, upstream communications from the ONU to the OLT. In at least some example embodiments, the first ONU instance has a first ONU identifier associated therewith, and the second ONU instance has a second ONU identifier associated therewith. In at least some example embodiments, supporting the set of ONU instances of the ONU includes sending, from the OLT toward the ONU, a first set of control messages indicating a first ONU identifier indicative of the first allocation identifier and indicating the first set of upstream communication settings, and sending, from the OLT toward the ONU, a second set of control messages indicating a second ONU identifier indicative of the second allocation identifier and indicating the second set of upstream communication settings. In at least some example embodiments, the method includes allocating a burst grant to the ONU by allocating the burst grant to the first ONU instance or the second ONU instance. In at least some example embodiments, the method includes determining a condition associated with the ONU, and allocating a burst grant to the ONU by allocating the burst grant to the first ONU instance or the second ONU instance based on the condition associated with the ONU. In at least some example embodiments, supporting the upstream communications from the ONU to the OLT includes supporting, by the OLT, bonding of the upstream communication of the first ONU instance and the upstream communication of the second ONU instance such that, for a traffic flow of the ONU, packets of the traffic flow sent based on the first ONU instance and packets of the traffic flow sent based on the second ONU instance are directed to a common reassembly queue. In at least some example embodiments, the method includes supporting, by the OLT based on the set of ONU instances of the ONU, downstream communications from the OLT to the ONU. In at least some example embodiments, the set of ONU instances operates on the same wavelength.

In at least some example embodiments, an apparatus includes means for supporting, by an optical line terminal (OLT) for an optical network unit (ONU), a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, and means for supporting, by the OLT based on the set of ONU instances of the ONU, upstream communications from the ONU to the OLT. In at least some example embodiments, the first ONU instance has a first ONU identifier associated therewith, and the second ONU instance has a second ONU identifier associated therewith. In at least some example embodiments, the means for supporting the set of ONU instances of the ONU includes means for sending, from the OLT toward the ONU, a first set of control messages indicating a first ONU identifier indicative of the first allocation identifier and indicating the first set of upstream communication settings, and means for sending, from the OLT toward the ONU, a second set of control messages indicating a second ONU identifier indicative of the second allocation identifier and indicating the second set of upstream communication settings. In at least some example embodiments, the apparatus includes means for allocating a burst grant to the ONU by allocating the burst grant to the first ONU instance or the second ONU instance. In at least some example embodiments, the apparatus includes means for determining a condition associated with the ONU, and means for allocating a burst grant to the ONU by allocating the burst grant to the first ONU instance or the second ONU instance based on the condition associated with the ONU. In at least some example embodiments, the means for supporting the upstream communications from the ONU to the OLT includes means for supporting, by the OLT, bonding of the upstream communication of the first ONU instance and the upstream communication of the second ONU instance such that, for a traffic flow of the ONU, packets of the traffic flow sent based on the first ONU instance and packets of the traffic flow sent based on the second ONU instance are directed to a common reassembly queue. In at least some example embodiments, the apparatus includes means for supporting, by the OLT based on the set of ONU instances of the ONU, downstream communications from the OLT to the ONU. In at least some example embodiments, the set of ONU instances operates on the same wavelength.

BRIEF DESCRIPTION OF THE DRAWINGS

The teachings herein can be readily understood by considering the following detailed description in conjunction with the accompanying drawings, in which:

FIG. 2 depicts an example embodiment of a method for establishing multiple ONU instances of an ONU in a PON;

FIG. 5 depicts an example embodiment of a method for use by an ONU for supporting communications between the ONU and an OLT based on multiple ONU instances of the ONU;

FIG. 6 depicts an example embodiment of a method for use by an OLT for supporting communications between the OLT and an ONU based on multiple ONU instances of the ONU.

To facilitate understanding, identical reference numerals have been used herein, wherever possible, in order to designate identical elements that are common among the various figures.

DETAILED DESCRIPTION

Figure 1:
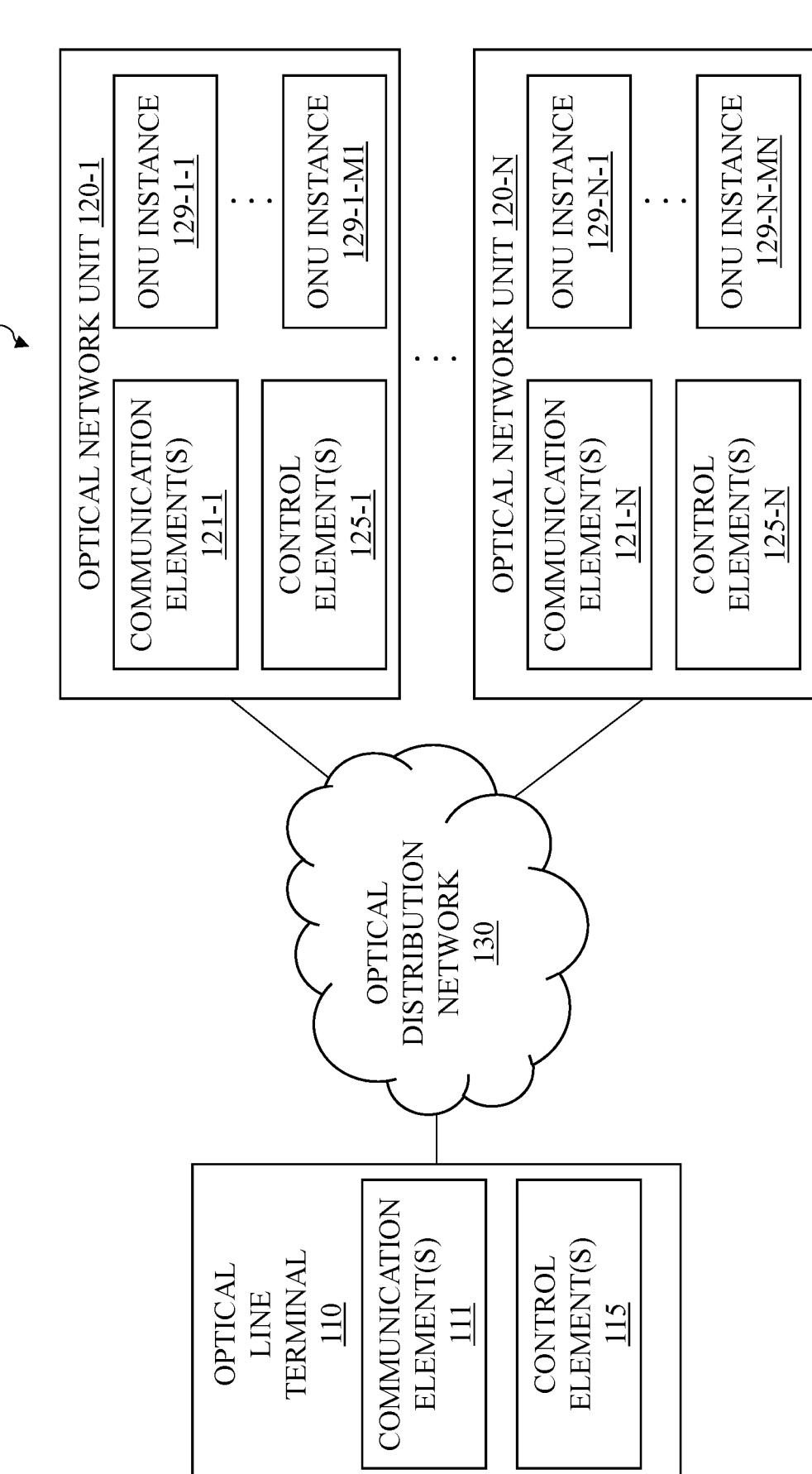
FIG. 1 depicts an example embodiment of a passive optical network (PON) configured to support communications between an optical line terminal (OLT) and an optical network unit (ONU) based on support for multiple ONU instances of the ONU within the PON.

Various example embodiments for supporting optical communications in an optical communication system are presented herein. It will be appreciated that, although primarily presented with respect to application of example embodiments within specific types of optical communication systems supporting specific types of optical communications, various example embodiments presented herein may be applied within the context of various other types of optical communication systems, may be applied for supporting various other types of optical communications, or the like, as well as various combinations thereof. Various example embodiments for supporting optical communications in an optical communication system may be configured to support optical communications within a passive optical network (PON) including an optical line terminal (OLT) and an optical network unit (ONU) where communications between the OLT and the ONU is supported based on support for multiple ONU instances of the ONU within the PON. The multiple ONU instances of the ONU may be active for the ONU concurrently. The multiple ONU instances of the ONU may have different sets of identifiers (e.g. ONU identifiers, Allocation identifiers, or the like, as well as various combinations thereof) associated therewith and different sets of communication settings (e.g., transmission rate, forward error correction (FEC) code, or the like, as well as various combinations thereof) associated therewith, respectively. The multiple ONU instances of the ONU may be used to seamlessly switch the ONU between use of different communication settings for upstream communications from the ONU to the OLT. The multiple ONU instances of the ONU may be used to seamlessly switch the ONU between use of different communication settings for upstream communications from the ONU to the OLT at various granularities (e.g., from burst to burst, from frame to frame, or the like, as well as various combinations thereof). The multiple ONU instances of the ONU may be used to seamlessly switch the ONU between use of different communication settings for upstream communications from the ONU to the OLT dynamically without a need to restart the ONU in order to switch the ONU between use of the different communication settings for upstream communications from the ONU to the OLT. The multiple ONU instances of the ONU may be used to support downstream communications from the OLT to the ONU. The multiple ONU instances of the ONU may be used by the OLT to perform control functions for the ONU. It will be appreciated that the multiple ONU instances of the ONU may be used by the OLT and/or the ONU for various other communication purposes and/or control purposes related to the operation of the ONU within the PON. It will be appreciated that these and various other example embodiments and advantages or potential advantages of supporting optical communications between an OLT and an ONU in a PON based on support for multiple ONU instances of the ONU may be further understood by way of reference to the various figures, which are discussed further below.

FIG. 1 depicts an example embodiment of a passive optical network (PON) configured to support communications between an optical line terminal (OLT) and an optical network unit (ONU) based on support for multiple ONU instances of the ONU within the PON.

The PON 100 may be a system for providing network access to a set of customers. For example, the PON 100 may provide broadband network access over "the last mile" (e.g., the final portion of a telecommunications network that supports communications for customers, including delivering communications to the customers and supporting communications from the customers). For example, the PON 100 may operate as a point-to-multipoint (P2MP) data distribution system. For example, the PON 100 may operate using various types of PON technologies, such as time-division multiplexing (TDM) in which the fiber medium is shared in time between the ONUs 120 (e.g., a gigabit-capable PON (GPON), an Ethernet PON (EPON), an XGS-PON, or the like), wavelength division multiplexing (WDM) in which the fiber medium is shared over different wavelengths for the ONUs 120 (e.g., a WDM PON), time-and-wavelength-division multiplexing (TWDM) in which the fiber medium is shared in both time and over different wavelengths for the ONUs 120 (e.g., a Next-Generation Passive Optical Network 2 (NG-PON2), or the like), or the like, as well as various combinations thereof. For example, the PON 100 may be based on various PON standards, such as the G.9804 standard for 50G PON or the like. It will be appreciated that the PON 100 may be based on various other PON standards, various other PON technologies, or the like, as well as various combinations thereof.

The PON 100 may include various communication elements configured to support optical communications. The PON 100 includes an optical line terminal (OLT) 110 and a set of optical network units (ONUs) 120-1-120-N (collectively, ONUs 120) connected via an optical distribution network (ODN) 130. The PON 100 may be configured to support downstream (DS) communications from the OLT 110 to the ONUs 120 via the ODN 130 and upstream (US) communications from the ONUs 120 to the OLT 110 via the ODN 130. The PON 100, for DS communications from the OLT 110 to the ONUs 120 via the ODN 130, may utilize various communication settings (e.g., transmission rates, FEC codes, or the like, as well as various combinations thereof) and so forth. The PON 100, for US communications from the ONUs 120 to the OLT 110 via the ODN 130, may utilize various types of multiplexing as discussed above, various communication settings (e.g., transmission rates, FEC codes, or the like, as well as various combinations thereof), and so forth. The PON 100, for US communications from the ONUs 120 to the OLT 110 via the ODN 130, may utilize burst-mode (BM) operation in which the ONUs 120 send upstream burst signals. It will be appreciated that the PON 100 may include various other elements which have been omitted for purposes of clarity.

The OLT 110 is configured to support communications between the ONUs 120 and one or more upstream networks (omitted for purposes of clarity). The OLT 110 may be located in a central location, such as a central office (CO) or other suitable location. For example, the one or more upstream networks may include one or more core communication networks configured to support communications of the OLT 110 and, thus, of the ONUs 120. For example, the OLT 110 may be configured to forward data received from the one or more upstream networks downstream toward the ONUs 120 via the ODN 130 and to forward data received from the ONUs 120 via the ODN 130 upstream toward the one or more upstream networks. The OLT 110 may include one or more communication elements 111 configured to support communications between the OLT 110 and the ONUs 120, including one or more transmission elements (e.g., an encoder, a transmitter, and the like) for DS communications to the ONUs 120 and one or more reception elements (e.g., a receiver, a decoder, and the like) for US communications from the ONUs 120. The OLT 110 may include one or more control elements 115 configured to control various aspects of communications between the OLT 110 and the ONUs 120, including one or more transmission controllers (e.g., an encoder controller or other controller), one or more reception controllers (e.g., a decoder controller or the like), and the like, as well as various combinations thereof. The OLT 110, including various components of the OLT 110 (e.g., communication elements 111, control elements 115, and the like) may be configured to support various functions for supporting multiple ONU instances for one or more of ONUs 120 within the PON 100). It will be appreciated that the OLT 110 may include various other elements for supporting communications with the ONUs 120, for supporting multiple ONU instances for one or more of the ONUs 120 within the PON 100, and the like, as well as various combinations thereof.

The ONUs 120 each are configured to support communications between the OLT 110 and one or more downstream networks or devices (omitted for purposes of clarity). The ONUs 120 may be located at respective user premises or other suitable locations. For example, the one or more downstream networks or devices for an ONU 120 may include one or more local area networks (LANs) of the customer, one or more communication devices of the customer (e.g., a modem, a router, a switch, a set top box, a smart television, a gaming system, a computer, a smartphone, or the like, as well as various combinations thereof). For example, an ONU 120 may be configured to forward data received from the OLT 110 via the ODN 130 downstream toward one or more downstream networks or devices and to forward data received from the one or more downstream networks or devices upstream toward the OLT 110 via the ODN 130. The ONUs 120 each may include one or more communication elements 121 (depicted as communication elements 121-1-121-N (collectively, communication elements 121) of ONUs 120-1-120-N, respectively) configured to support communications between the ONUs 120 and the OLT 110, including one or more transmission elements (e.g., an encoder, a transmitter, and the like) for US communications to the OLT 110 and one or more reception elements (e.g., a receiver, a decoder, and the like) for DS communications from the OLT 110. The ONUs 120 each may include one or more control elements 125 (depicted as control elements 125-1-125-N (collectively, control elements 125) of ONUs 120-1-120-N, respectively) configured to control various aspects of communications between the ONUs 120 and the OLT 110, including one or more transmission controllers (e.g., an encoder controller or other controller), one or more reception controllers (e.g., a decoder controller or the like), and the like, as well as various combinations thereof. The ONUs 120, including various components of the ONUs 120 (e.g., communication elements 121, control elements 125, and the like) may be configured to support various functions for supporting multiple ONU instances for one or more of the ONUs 120 within the PON 100). It will be appreciated that each of the ONUs 120 may include various other elements for supporting communications with the OLT 110, for supporting multiple ONU instances for one or more of the ONUs 120 within the PON 100, and the like, as well as various combinations thereof.

The ODN 130 may be a data distribution system configured to support communications between the OLT 110 and the ONUs 120. The ODN 130 is depicted as being arranged in a branching configuration; however, it will be appreciated that various other P2MP configurations may be used. The ODN 130 may include various passive optical components (e.g., optical fibers, optical couplers, optical splitters, and the like) which do not require power in order to support distribution of data signals between the OLT 110 and the ONUs 120; however, it will be appreciated that, in certain instances, the ODN 130 also may include active components to support communications between the OLT 110 and the ONUs 120 (e.g., optical amplifiers and the like). It will be appreciated that the ODN 130 may include various other elements for supporting communications between the OLT 110 and the ONUs 120.

The PON 100 is configured to support communications of an ONU 120 based on support for multiple ONU instances of the ONU 120. As illustrated in FIG. 1, each of the ONUs 120 includes a set of multiple ONU instances 129. For example, ONU 120-1 includes M1 ONU instances 129-1-1 to 129-1-M1 (collectively, ONU instances 129-1 for ONU 120-1), ONU 120-2 includes M2 ONU instances 129-2-1 to 129-2-M2 (collectively, ONU instances 129-2 for ONU 120-2), and so forth, with ONU 120-N including MN ONU instances 129-N–1 to 129-N-MN (collectively, ONU instances 129-N for ONU 120-N), where it will be understood that the numbers of ONU instances 129 supported by the ONUs 120 (namely, M1, M2, . . . , MN) may be the same or different across the various ONUs 120. The ONU instances 129 of a given ONU 120 are concurrently active on the given ONU 120. It will be appreciated that, although primarily presented with respect to instantiation of N ONU instances 129 on each of the ONUs 120, the number of ONU instances 129 instantiated and concurrently active on the ONUs 120 may vary across the ONUs 120. It will be appreciated that, although primarily presented with respect to use of multiple ONU instances 129 on each of the ONUs 120, multiple ONU instances 129 may or may not be instantiated on any given ONU 120 (i.e., one or more of the ONUs 120 may operate using a single ONU instance 129).

In the PON 100, the multiple ONU instances 129 of an ONU 120 may be configured to have different sets of identifiers (e.g., ONU identifiers (ONU-IDs), Allocation identifiers (Alloc-IDs), or the like, as well as various combinations thereof) associated therewith and different sets of US communication settings (e.g., transmission rate, FEC codes, or the like, as well as various combinations thereof) associated therewith, respectively. The multiple ONU instances 129 of an ONU 120 may be supported by the ONU 120 and the OLT 110. The multiple ONU instances 129 of an ONU 120 may be established within the PON 100 by activating the ONU multiple times for the multiple ONU instances 129, respectively, thereby providing multiple concurrently active ONU instances 129 on the ONU 120. The multiple ONU instances 129 of an ONU 120 may be used for supporting US communications from the ONU 120 to the OLT 110 (e.g., by the OLT 110 for scheduling the US bursts by the ONU 120 based on the different US communication settings of the ONU instances 129, by the ONU 120 for transmitting US bursts based on the different US communication settings of the ONU instances 129, by the OLT 110 for processing US bursts from the ONU 120 based on the different US communication settings of the ONU instances 129, and so forth), may be used for supporting DS communications from the OLT 110 to the ONU 120 (e.g., by the OLT 110 for performing DS communications and by the ONU 120 for handling DS communications from the OLT 110), may be used for supporting management of the ONU 120 by the OLT 110 (e.g., for supporting communication of control messages used for management of the ONU 129 by the OLT 110), or the like, as well as various combinations thereof.

In the PON 100, the multiple ONU instances 129 of an ONU 120 are instantiated by the OLT 110 such that the multiple ONU instances 129 of the ONU 120 are supported by the OLT 110 and the ONU 120. The multiple ONU instances 129 of an ONU 120 may be configured to have different sets of identifiers (e.g., ONU identifiers (ONU-IDs), Allocation identifiers (Alloc-IDs), or the like, as well as various combinations thereof) associated therewith and different sets of communication settings (e.g., transmission rate, FEC codes, or the like, as well as various combinations thereof) associated therewith, respectively. The different sets of identifiers for the multiple ONU instances 129 of the ONU 120 may include different ONU-IDs and different Alloc-IDs for the different ONU instances 129 of the ONU 120, respectively. The different sets of US communication settings for the multiple ONU instances 129 of the ONU 120 may include use of different US transmission rates by the different ONU instances 129 of the ONU 120, use of the same US transmission rate but different FEC codes by the different ONU instances 129 of the ONU 120 (e.g., the G.9804.2 Amendment 1 will allow using multiple FEC codes), or the like, as well as various combinations thereof. The multiple ONU instances 129 of an ONU 120 may be established within the PON 100 by activating the ONU 120 multiple times for the multiple ONU instances 129 of the ONU 120, respectively, such that the multiple ONU instances 129 of the ONU 120 are active concurrently at the ONU 120. The activation of the ONU 120 multiple times for the multiple ONU instances 129 of the ONU 120 may be performed using control messages sent from the OLT 110 to the ONU 120 (e.g., Physical Layer Operation Administration and Maintenance (PLOAM) messages or other control messages). An example embodiment of a method for instantiating two ONU instances 129 for an ONU 120 (having different ONU-IDs, Alloc-IDs, and US rates assigned thereto) is presented with respect to FIG. 2.

FIG. 2 depicts an example embodiment of a method for establishing multiple ONU instances of an ONU in a PON. It will be appreciated that, although primarily presented herein as being performed serially, at least a portion of the functions of method 200 of FIG. 2 may be performed contemporaneously or in a different order than as presented in FIG. 2. It will be appreciated that, while each of the functions of method 200 of FIG. 2 is primarily described from a particular perspective (e.g., from the perspective of the OLT or from the perspective of the ONU for which the multiple ONU instances are being established), any of the functions of method 200 of FIG. 2 may be considered to involve functions performed by the OLT and functions performed by the ONU (i.e., it will be understood that the method 200 of FIG. 2 may be considered to represent an overall method within which the OLT performs an OLT-specific method for establishing the multiple ONU instances of the ONU and in which the ONU performs an ONU-specific method for establishing the multiple ONU instances of the ONU).

In FIG. 2, the method 200 is configured to activate, or instantiate, the ONU twice, thereby resulting in two concurrently active ONU instances of the ONU that have different ONU-IDs and Alloc-IDs associated therewith and that support two different US rates which are supported by the ONU. It will be appreciated that the two concurrently active instances of the ONU may then be used by the ONU and the OLT for various purposes which are related to supporting communications between the OLT and the ONU (e.g., US bursts from the ONU to the OLT, DS communications from the OLT to the ONU, and so forth).

At block 201, the method 200 begins. As illustrated in FIG. 2, the method 200 then proceeds to block 210.

At block 210, the ONU locks onto a downstream transmission from the OLT and acquires information on the PON system from the downstream transmission from the OLT. The ONU also starts monitoring the allocation grants provided by the OLT for upstream bursts from the ONUs. For example, in G.9804.2, a Reserved Broadcast Alloc-ID may be used by the OLT in a serial number grant allocation structure to indicate that any ONU transmitting at the indicated upstream line rate which executes the serial number acquisition phase of the activation procedure may use this allocation to transmit a serial number response. It will be appreciated that, in at least some example embodiments, the ONU may operate on a wavelength such that each ONU instance that is instantiated for the ONU also operates on that wavelength (i.e., the wavelength is common to each of the ONU instances supported by the ONU such that the ONU instances use the same wavelength).

At block 220, the ONU makes the OLT aware of its presence by responding to a serial number grant allocated by the OLT. The ONU responds to the serial number grant allocated by the OLT by sending a serial_number_ONU PLOAM message to the OLT. The serial_number_ONU PLOAM message includes ONU capability information of the ONU that is indicative of the capabilities supported by the ONU (including US rates supported by the ONU, which may be used by the OLT for establishing the multiple ONU instances supporting multiple different US rates). The serial_number_ONU PLOAM message also may include one or more indications related to support for multiple ONU instances (e.g., one or more of an indication as to whether the ONU supports multiple ONU instances, an indication of a quantity of ONU instances supported by the ONU, or the like, as well as various combinations thereof. It will be appreciated that, although primarily described within the context of providing such indications related to support for multiple ONU instances in the same serial_number_ONU PLOAM message used to provide ONU capability information of the ONU, the indications related to support for multiple ONU instances may be provided in various other ways (e.g., using one or more additional PLOAM messages, one or more other suitable message types, or the like, as well as various combinations thereof).

At block 230-1, the OLT initiates instantiation of a first ONU instance of the ONU in the PON. The OLT may initiate instantiation of the first ONU instance of the ONU by sending an Assign_ONU-ID PLOAM message to the ONU (where the ONU-ID uniquely identifies the ONU in the PON network). The Assign_ONU-ID PLOAM message includes the ONU-ID for the first ONU instance of the ONU (in this example, referred to as ONU-ID-1). The Assign_ONU-ID PLOAM message also includes an US rate indication for the US rate to be used by the first ONU instance (in this example, referred to as RATE1) for US bursts. The assignment of the ONU-ID, ONU-ID-1, to the first ONU instance also leads to an implicit assignment of a default directed Allocation ID (Alloc-ID) to the first ONU instance (in this example, referred to as Alloc-ID-1). It will be appreciated that, although primarily presented with respect to assignment of a single (default) directed Alloc-ID to the first ONU instance, the OLT may assign one or more additional Alloc-IDs from the set of Explicitly Assignable Alloc-IDs to the first ONU instance using one or more additional PLOAM messages, thereby resulting in a set of multiple Alloc-IDs for the first ONU instance. It will be appreciated that the first ONU instance of the ONU may operate on a particular wavelength supported by the ONU.

At block 230-2, the OLT initiates instantiation of a second ONU instance of the ONU in the PON, using a process similar to instantiation of the first ONU instance of the ONU in the PON. The OLT may initiate instantiation of the second ONU instance of the ONU by sending an Assign_ONU-ID PLOAM message to the ONU (where the ONU-ID uniquely identifies the ONU in the PON network). The Assign_ONU-ID PLOAM message includes the ONU-ID for the second ONU instance of the ONU (in this example, referred to as ONU-ID-2), which is different than the ONU-ID for the first ONU instance of the ONU (which, as indicated above, is ONU-ID-1). The Assign_ONU-ID PLOAM message also includes an US rate indication for the US rate to be used by the second ONU instance (in this example, referred to as RATE2) for US bursts, which is different than the US rate for the first ONU instance of the ONU (which, as indicated above, is RATE1). The assignment of the ONU-ID, ONU-ID-2, to the second ONU instance also leads to an implicit assignment of a default directed Allocation ID (Alloc-ID) to the second ONU instance (in this example, referred to as Alloc-ID-2), which is different than the Alloc-ID for the first ONU instance of the ONU (which, as indicated above, is Alloc-ID-1). It will be appreciated that, although primarily presented with respect to assignment of a single default directed Alloc-ID to the second ONU instance, the OLT may assign one or more additional Alloc-IDs from the set of Explicitly Assignable Alloc-IDs to the second ONU instance using one or more additional PLOAM messages, thereby resulting in a set of multiple Alloc-IDs for the second ONU instance. It will be appreciated that the second ONU instance of the ONU may operate on the same wavelength that is operated on by the first ONU instance of the ONU, such that the ONU instances of the ONU are operating on the same wavelength.

At block 299, the method 299 ends. It will be appreciated that the method 200, although primarily presented as ending (for purposes of clarity), may continue to operate for various purposes (e.g., for instantiating additional ONU instances of the ONU, for utilizing the ONU instances of the ONU for various purposes, or the like, as well as various combinations thereof).

It will be appreciated that the method 200 of FIG. 2 may be generalized in various ways, such as by supporting other types of communication settings for the different ONU instances of the ONU (e.g., in addition to or in place of the US rates presented with respect to the method 200 of FIG. 2), supporting more than two different instances of the ONU (e.g., additional blocks similar to blocks 230-1 and 230-2 may be executed by the method 200 to generate additional concurrently active instances of the ONU which may enable seamless operation of the ONU with more than two different sets of communication settings (e.g., three ONU instances may be created so that the ONU can support US transmission at all three US line rates—12.5G, 25G, and 50G—specified in G.9804).

As discussed further below, the multiple ONU instances of the ONU, having different sets of identifiers and different sets of communication settings, may be used for various purposes. For example, as discussed further below within the context of FIG. 1, the multiple instances 129 of an ONU 120 may be used by the OLT 110 and the ONU 120 to support US communication by the ONU 120 to the OLT 110 (e.g., the OLT 110 can allocate grant bursts to either the Alloc-ID-1 associated with the first ONU instance or the Alloc-ID-2 associated with the second ONU instance so as to select the US rate used by the ONU 120 and, in this way, the US rate of the ONU 120 can switch seamlessly from burst to burst or frame to frame), may be used by the OLT 110 and the ONU 120 to support DS communications by the OLT 110 to the ONU 120 (e.g., using either the DS channel associated with the first ONU instance or the DS channel associated with the second ONU instance to send DS communications to the ONU 120), may be used by the OLT 110 to support management of the ONU 120 by the OLT 110, or the like, as well as various combinations thereof.

In the PON 100, the multiple ONU instances 129 of an ONU 120 may be used to support US communication by an ONU 120 to the OLT 110. The ONU 120 is configured to support US bursts to the OLT 110 while supporting multiple ONU instances 129 of the ONU 120. An example embodiment of an ONU 120 for generating US bursts to the OLT 110 when multiple ONU instances 129 are active concurrently at the ONU 120 is presented with respect to FIG. 3. The OLT 110 is configured to support US bursts from an ONU 120 while supporting the multiple ONU instances 129 of the ONU 120. An example embodiment of the OLT for processing US bursts from an ONU 120 when multiple ONU instances 129 are active concurrently at the ONU 120 is presented with respect to FIG. 4. It will be appreciated that the OLT 110 and the ONU 120 also may be configured to use the multiple concurrently active ONU instances 129 of the ONU 120 to support various operational modes for US communication by the ONU 120 to the OLT 110 (e.g., a protection mode, an energy efficiency mode, or the like, as well as various combinations thereof).

Figure 3:
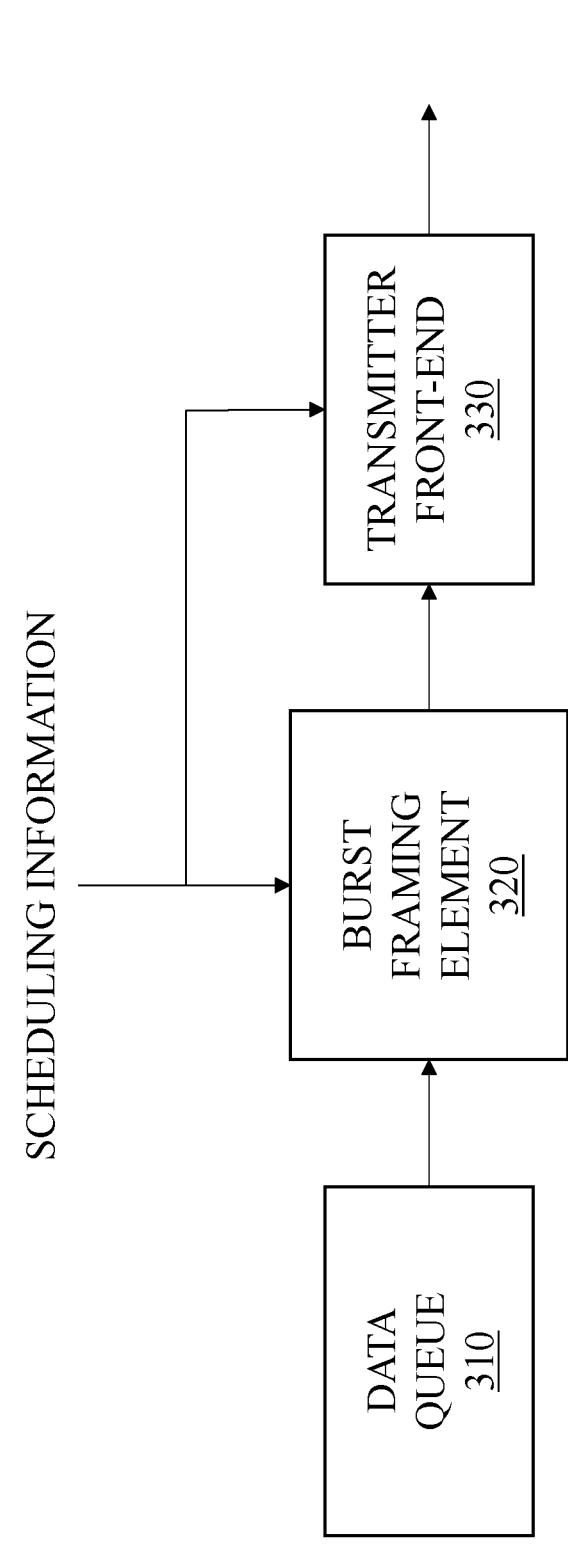
FIG. 3 depicts an example embodiment of a portion of the ONU configured to support US bursts to the OLT based on use of multiple ONU instances of the ONU.

In the PON 100, an ONU 120 supporting multiple concurrently active ONU instances 129 may be configured to use the multiple ONU instances 129 of the ONU 120 for US bursts to the OLT 110. FIG. 3 depicts an example embodiment of a portion of an ONU 120 configured to support US bursts to the OLT 110 based on use of multiple ONU instances 129 of the ONU 120. As illustrated in FIG. 3, an ONU 300 includes a data queue 310, a burst framing element 320, and a transmitter front-end 330. The ONU 300 is configured to support US bursts to an OLT (omitted for purposes of clarity) while seamlessly switching between use of different ONU instances having different communication settings associated therewith. In the example embodiment of FIG. 3, it is assumed that the ONU 300 which transmits the US bursts supports the two ONU instances described with respect to FIG. 2 (namely, a first ONU instance having ONU-ID-1 and Alloc-ID-1 and supporting RATE1 and a second ONU instance having ONU-ID-2 and Alloc-ID-2 and supporting RATE2).

The data queue 310 queues US data to be sent toward an OLT. The data queue 310 is served by US bursts for each of the multiple ONU instances of the ONU and, thus, is served by US bursts with multiple allocation IDs given that different allocation IDs are assigned to the different ONU instances of the ONU (e.g., Alloc-ID-1 and Alloc-ID-2 from the example of FIG. 2). It will be appreciated that, although a single data queue 310 is depicted for purposes of clarity, multiple data queues may be used by the ONU instances of the ONU such that each of the multiple data queues may be served by each of the multiple ONU instances of the ONU (e.g., if there are four data queues and two ONU instances of the ONU then each of the four queues may be served by two allocations). The US data of the data queue 310 is provided to the burst framing element 320.

The burst framing element 320 receives the US data from the data queue 310, receives scheduling information indicative of scheduling of US bursts (e.g., received from the OLT, and indicative of which of the ONU instances of the ONU is to be used for the US burst), and generates a burst bit stream for the US burst based on the scheduling information. The burst framing element 320 may generate the burst bit stream based on the communication settings associated with the one of the ONU instances of the ONU to be used for the US burst (e.g., generating a burst with line rate RATE1 for allocations to the first ONU instance or generating a burst with line rate RATE2 for allocations to the second ONU instance). The burst framing element 320 may generate the burst bit stream by applying encapsulation (e.g., GEM encapsulation or any other suitable type of encapsulation) to form frames, applying one or more headers to the frames, and so forth. For example, within the context of a GPON, the burst framing element 320 may apply GEM encapsulation, generate the FS header, and so forth. The burst framing element 320 may perform various other functions to generate the burst bit stream for the US burst. The burst framing element 320 may generate the burst bit stream such that each burst frame identifies the one of the ONU instances of the ONU for which the US burst is to be sent (e.g., the header of the burst frame may include the ONU-ID and Alloc-ID of the ONU instance with which the US burst is associated).

The transmitter front-end 330 receives the burst bit stream from the burst framing element 320, receives scheduling information indicative of scheduling of US bursts (e.g., received from the OLT, and indicative of when the US burst is scheduled), and transmits a burst signal indicative of the burst bit stream toward the OLT based on the scheduling information.

It will be appreciated that the ONU 300 may include various other elements which may support US transmissions based on support for multiple concurrently active ONU instances.

Figure 4:
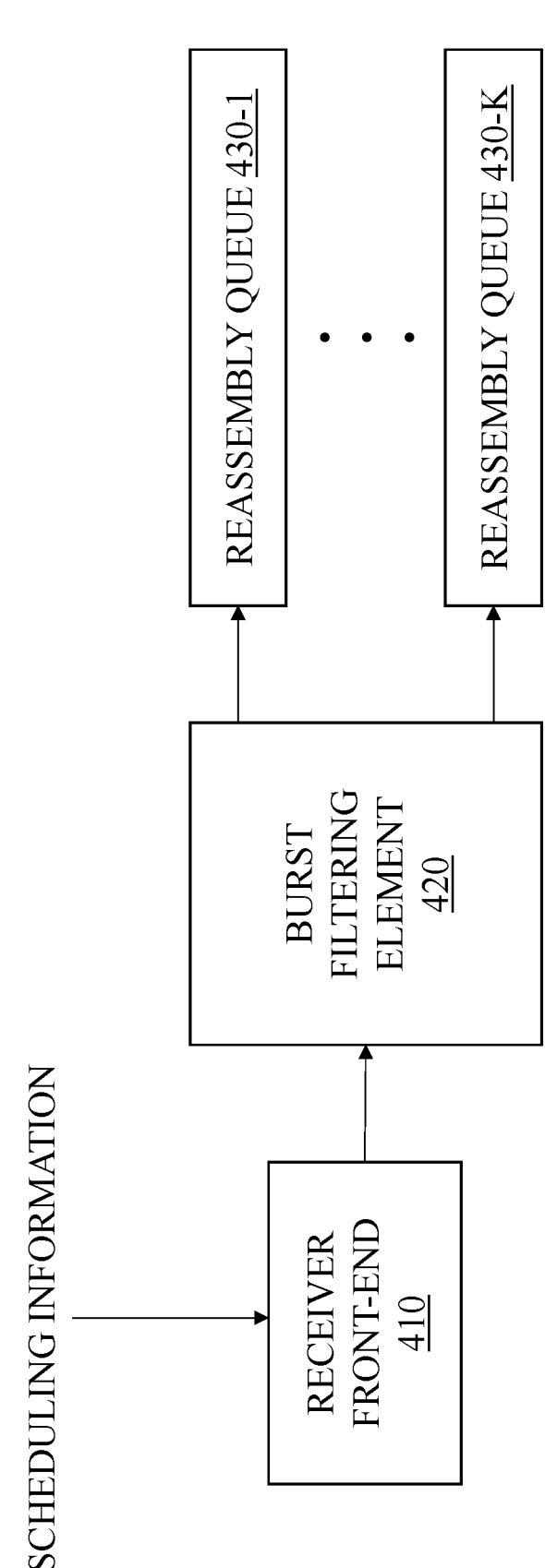
FIG. 4 depicts an example embodiment of a portion of an OLT configured to support upstream bursts from the ONU to the OLT based on use of multiple ONU instances of the ONU.

In the PON 100, the OLT 110 supporting multiple concurrently active ONU instances 129 of the ONU 120 may be configured to use the multiple ONU instances 129 of the ONU 120 for US bursts from the ONU 120. FIG. 4 depicts an example embodiment of a portion of an OLT 110 configured to support US bursts from an ONU 120 to the OLT 110 based on use of multiple ONU instances 129 of the ONU 120. As illustrated in FIG. 4, an OLT 400 includes a receiver front-end 410, a burst filtering element 420, and a set of reassembly queues 430-1 to 430-K (collectively, reassembly queues 430). The OLT 400 is configured to support US bursts from an ONU (omitted for purposes of clarity) while seamlessly controlling switching of the ONU between use of different ONU instances having different communication settings associated therewith. In the example embodiment of FIG. 4, it is assumed that the ONU from which OLT 400 receives US bursts supports the two ONU instances described with respect to FIG. 2 (namely, a first ONU instance having ONU-ID-1 and Alloc-ID-1 and supporting RATE1 and a second ONU instance having ONU-ID-2 and Alloc-ID-2 and supporting RATE2).

The receiver front-end 410 receives US bursts from ONU, receives scheduling information indicative of scheduling of the US bursts received from the ONU, and processes the US bursts based on the scheduling information. The scheduling information is available locally as this scheduling information was provided to the ONU for controlling scheduling of the US bursts that are received. The scheduling information is indicative of which of the ONU instances of the ONU was used for the US bursts. The scheduling information may include rate/burst configuration information or other suitable types of information. The receiver front-end 410 identifies, for each of the US bursts based on the scheduling information, the ONU instance with which the US burst is associated, respectively. The receiver front-end 410, for a given US burst, knows the rate of the US burst from the communication settings associated with the ONU instance with which the US burst is associated (e.g., line rate RATE1 for allocations to the first ONU instance or line rate RATE2 for allocations to the second ONU instance) and processes the US burst based on the rate of the US burst, respectively.

The burst filtering element 420 is configured to filter US bursts received from ONUs and direct the packets of the US bursts toward the reassembly queues 430 for reassembly. For a given ONU from which US bursts are received, the packets of the US bursts from the ONU may be XGEM frames (e.g., including XGEM port identifiers), which may be transporting data of one or more traffic flows from the ONU (e.g., with different traffic flows being indicated by different Transmission Container (TCONT) identifiers). The burst filtering element 420 may be configured to filter packets of the US bursts from the ONU on a per traffic flow basis, where the traffic flow of a packet may be based on the XGEM port identifiers associated with packets of US bursts of the ONU or TCONT identifiers associated with traffic flows of the ONU which included data within the packets of the US bursts of the ONU. The burst filtering element 420 is configured to filter US bursts from the ONU such that, for a given traffic flow of the ONU, the packets from US bursts for the multiple ONU instances of that ONU which are transporting data of the traffic flow are directed to a common reassembly queue 430 for that traffic flow (i.e., packets associated with the traffic flow and present in US bursts coming from the multiple ONU instances of the ONU are directed to a common reassembly queue 430 for that traffic flow), thereby providing bonding across the ONU instances of the traffic flow of the ONU such that reassembly for that traffic flow can be performed at the OLT irrespective of which of the ONU instances of the ONU were used for the US bursts from the ONU to the OLT. It is noted that this approach allows for recombining of fragmented packets that got separated over US bursts using different ONU instances (e.g., even for packets transmitted upstream using different rates). It is noted that different traffic flows of an ONU may be directed to different ones of the reassembly queues 430. It will be appreciated that, although primarily presented with respect to example embodiments in which there is a 1:1 relationship between the traffic flow of an ONU and a reassembly queue 430-x used to support that traffic flow of the ONU (even where packets of the traffic flow are distributed across US bursts using different ONU instances of the ONU), the reassembly queues 430 may be used in other ways for supporting US bursts from ONUs (e.g., multiple reassembly queues 430 may be associated in some way to enable a set of multiple reassembly queues 430 to support a given US traffic flow of a given ONU).

It will be appreciated that the OLT 400 may include various other elements which may support US transmissions based on support for multiple concurrently active ONU instances.

In the PON 100, the multiple ONU instances 129 of an ONU 120 may be used to support various operational modes for US communication by the ONU 120. For example, the multiple ONU instances 129 of an ONU 120 may be used to support a protection mode, an energy efficiency mode, or the like, as well as various combinations thereof.

In at least some example embodiments, as indicated above, the multiple ONU instances 129 of an ONU 120 may be used to support a protection mode for the ONU 120.

In this mode of operation, the OLT 110 monitors the US channel quality levels of the US channels from the ONU 120 to the OLT 110 for the different ONU instances 129 of the ONU 120 (e.g., based on bit error rate (BER), channel quality indicator (CQI), or the like, as well as various combinations thereof) and schedules US bursts from the ONU 120 using different ONU instances 129 of the ONU 120 based on the US channel quality levels of the US channels from the ONU 120 to the OLT 110 for the different ONU instances 129 of the ONU 120 (e.g., using different ONU instances 129 of the ONU 120 supporting different US rates depending on whether the US channel quality levels of US channels of the different ONU instances of the ONU 120 satisfy quality thresholds, respectively). In this manner, the OLT 110 protects the ONU 120 by using the multiple ONU instances 129 of the ONU 120 to dynamically ensure that the ONU 120 is operating at the optimal US rate for the US channel conditions of the ONU 120.

The OLT 110 may monitor the US channel quality levels of the US channels from the ONU 120 to the OLT 110 for the different ONU instances 129 of the ONU 120 using various channel monitoring techniques. For example, the OLT 110 may monitor the US channel quality level of an US channel from the ONU 120 to the OLT 110 for one of the ONU instances 129 of the ONU 120 by periodically allocating relatively short test bursts (e.g., PLOAM bursts or the like) at a particular US rate to determine the US channel quality level of the US channel when trying to support that US rate (e.g., at a higher US rate where the protection mode supports switching between the higher US rate and a lower US rate based on the US channel quality level of the US channel from the ONU 120 to the OLT 110). It will be appreciated that the OLT 110 may monitor the US channel quality levels of the US channels from the ONU 120 to the OLT 110 for the different ONU instances 129 of the ONU 120 using various other types of channel monitoring techniques.

The OLT 110 may schedule US bursts from the ONU 120 using different ONU instances 129 of the ONU 120. The OLT 110 may schedule US bursts from the ONU 120 based on the US channel quality levels of the US channels from the ONU 120 to the OLT 110 for the different ONU instances 129 of the ONU 120. For example, the OLT 110 may schedule US bursts from the ONU 120 using a first ONU instance 129-x of the ONU 120 that supports a higher US rate when the US channel quality level of the US channel for that ONU instance 129-x of the ONU 120 is above the quality threshold and may schedule US bursts from the ONU 120 using a second ONU instance 129-y of the ONU 120 that supports a lower US rate when the US channel quality level of the US channel for the first ONU instance 129-x of the ONU 120 is below the quality threshold. The OLT 110 may dynamically switch between scheduling US bursts from the ONU 120 using the different ONU instances 129 of the ONU 120 as the US channel conditions change (e.g., switching from the first ONU instance 129-x supporting the higher US rate to the second ONU instance 129-y supporting the lower US rate when the channel quality of the US channel associated with the first ONU instance 129-x supporting the higher US rate deteriorates to below the quality threshold and then switching back from the second ONU instance 129-y supporting the lower US rate to the first ONU instance 129-x supporting the higher US rate when the channel quality of the US channel associated with the first ONU instance 129-x supporting the higher US rate improves to above the quality threshold. In this manner, the OLT 110 is able to ensure that the ONU 120 is operating at the optimal US rate for the US channel conditions of the ONU 120 even as the US channel conditions associated with the ONU 120 dynamically change over time.

For example, within the context of the G.9804 standard where a first ONU instance 129-x of the ONU 120 is instantiated for supporting the 50G US rate and a second ONU instance 129-y of the ONU 120 is instantiated for supporting the 25G US rate, the OLT 110 may monitor the US channel quality level of the US channel of the first ONU instance 129-x of the ONU 120 supporting the 50G rate (e.g., based on comparison with a BER threshold), and schedule US bursts using the first ONU instance 129-x of the ONU 120 supporting the 50G rate when the channel quality for the US channel of first ONU instance 129-x of the ONU 120 supporting the 50G rate is sufficiently good (e.g., the BER of the US channel is below the BER threshold) and schedule US bursts using the second ONU instance 129-y of the ONU 120 supporting the 25G rate when the channel quality for the US channel of first ONU instance 129-x of the ONU 120 supporting the 50G rate is bad (e.g., the BER of the US channel is above the BER threshold).

It will be appreciated that use of the multiple concurrently active ONU instances 129 of an ONU 120 to support a protection mode for the ONU 120 may be supported using various other functions which may be supported by the OLT 110 and/or the ONU 120.

In at least some example embodiments, as indicated above, the multiple ONU instances of an ONU 120 may be used to support an energy efficiency mode for the ONU 120.

In this mode of operation, the OLT 110 monitors the US traffic demand from the ONU 120 to the OLT 110 and schedules US bursts from the ONU 120 using different ONU instances 129 of the ONU 120 for different US traffic demand levels from the ONU 120 to the OLT 110 (e.g., using different ONU instances 129 of the ONU 120 supporting different US rates depending on whether the US traffic demand of the ONU 120 satisfies a threshold). In this manner, the OLT 110 supports energy efficient operation of the ONU 120 by using the multiple ONU instances 129 of the ONU 120 to dynamically ensure that the ONU 120 is operating at the optimal US rate for the US traffic demand of the ONU 120 (e.g., using a lower US rate having better energy efficiency when US traffic demand is lower and only switching to a higher US rate when the US traffic demand is higher).

The OLT 110 may monitor the US traffic demand from the ONU 120 to the OLT 110 using various traffic monitoring techniques. For example, the OLT 110 may monitor the US traffic demand from the ONU 120 to the OLT 110 by monitoring requests from the ONU 120 for US burst allocations. For example, the OLT 110 may monitor the US traffic demand from the ONU 120 to the OLT 110 based on monitoring of historical information indicative of historical traffic demand for the ON 120 (e.g., based on day of the week, time of day, or the like, as well as various combinations thereof). For example, the OLT 110 may monitor the US traffic demand from the ONU 120 to the OLT 110 based on buffer filling indicators provided from the ONU 120 to the OLT 110. It will be appreciated that the OLT 110 may monitor the US traffic demand from the ONU 120 to the OLT 110 using various other types of traffic monitoring techniques.

The OLT 110 may schedule US bursts from the ONU 120 using different ONU instances 129 of the ONU 120 for different US traffic demand levels of the ONU 120. For example, the OLT 110 may schedule US bursts from the ONU 120 using an ONU instance 129 of the ONU 120 that supports a lower US rate when the US traffic demand level for the ONU 120 is below the US traffic demand threshold and may schedule US bursts from the ONU 120 using an ONU instance 129 of the ONU 120 that supports a higher US rate when the US traffic demand level of the ONU 120 is above the US traffic demand threshold. The OLT 110 may dynamically switch between scheduling US bursts from the ONU 120 using the different ONU instances 129 of the ONU 120 as the US traffic demand of the ONU 120 changes (e.g., switching from the ONU instance 129 supporting the lower US rate to the ONU instance 129 supporting the higher US rate when the US traffic demand increases and then switching back from the ONU instance 129 supporting the higher US rate to the ONU instance 129 supporting the lower US rate when the US traffic demand decreases. In this manner, the OLT 110 is able to ensure that the ONU 120 is operating at the optimal US rate for the US traffic of the ONU 120, in terms of energy efficiency of the ONU 120, even as the US traffic demand of the ONU 120 dynamically changes over time.

For example, within the context of the G.9804 standard, where the lower US rate can be 25G and the higher US rate 50G, the OLT 110 may schedule bursts using the 25G rate when the US traffic demand is relatively low (since operation of the ONU 120 at the 25G rate may be more energy efficient than operation of the ONU 120 at the 50G rate) and may schedule bursts using the 50G rate when the US traffic demand is relatively high (since operation of the ONU 120 at the 50G rate is less energy efficient than operation of the ONU 120 at the 25G rate).

It will be appreciated that use of the multiple concurrently active ONU instances 129 of an ONU 120 to support an energy efficiency mode for the ONU 120 may be supported using various other functions which may be supported by the OLT 110 and/or the ONU 120.

In the PON 100, the multiple ONU instances 129 of an ONU 120 may be used to support DS communications from the OLT 110 to the ONU 120. Here, although there are multiple ONU instances 129 of the ONU 120, the OLT 110 only needs to send the DS communications to one of the multiple ONU instances 129 of the ONU 120. The OLT 110 may send the DS communications to one of the multiple ONU instances 129 of the ONU 120 based on association of a packet flow port identifier, which is assigned by the OLT 110 to the ONU 120, to one or more of the ONU instances 129 of the ONU 120 and inclusion of that packet flow port identifier within the DS packets used for the DS communication. For example, in a PON based on XG-PON or XGS-PON, the DS data may be sent in XGEM packets that have an XGEM port identifier that is associated with one or more of the ONU instances 129 of the ONU 120. It is noted that, in some cases, the OLT 110 may send DS communication to two or more (or all) of the ONU instances 129 of the ONU 120 (e.g., to provide redundancy that supports more reliable delivery of the DS communications from the OLT 110 to the ONU 120).

In the PON 100, the multiple ONU instances 129 of an ONU 120 may be used to support management of the ONU 120 by the OLT 110. The OLT 110 may send a control message to the ONU 120 using any of the ONU instance 129 of the ONU 120. The OLT 110 may send a control message to the ONU 120 via a control channel associated with one of the ONU instances 129 of the ONU 120 (e.g., using the ONU identifier assigned to the one of the ONU instances 129 of the ONU 120). The ONU 120 may receive control messages via control channels associated with any of the ONU instances 129 of the ONU 120. The ONU 120, where the control message is specific to the ONU instance 129 of the ONU 120 for which the control message is received, may process the control message only for that ONU instance 129 of the ONU 120 and not for any other ONU instances 129 of the ONU 120. The ONU 120, where the control message is not specific to the ONU instance 129 for which the control message is received, may process the control message for each of the ONU instances 129 of the ONU 120 or for the ONU 120 itself as opposed to for the multiple ONU instances 129 of the ONU 120.

It will be appreciated that the PON 100 may be configured to support various other capabilities based on support for multiple concurrently active ONU instances of ONUs.

FIG. 5 depicts an example embodiment of a method for use by an ONU for supporting communications between the ONU and an OLT based on multiple ONU instances of the ONU. It will be appreciated that, although primarily presented as being performed serially, at least a portion of the functions of the method 500 may be performed contemporaneously or in a different order than as presented with respect to FIG. 5. At block 501, method 500 begins. At block 510, support, by an optical network unit (ONU), a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings. At block 520, support, by the ONU based on the set of ONU instances of the ONU, upstream communications from the ONU to an optical line terminal (OLT). At block 599, the method 500 ends. It will be appreciated that various functions presented herein with respect to FIGS. 1-4 may be incorporated within the context of method 500 of FIG. 5.

FIG. 6 depicts an example embodiment of a method for use by an OLT for supporting communications between the OLT and an ONU based on multiple ONU instances of the ONU. It will be appreciated that, although primarily presented as being performed serially, at least a portion of the functions of the method 600 may be performed contemporaneously or in a different order than as presented with respect to FIG. 6. At block 601, method 600 begins. At block 610, support, by an optical line terminal (OLT) for an optical network unit (ONU), a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings. At block 620, support, by the OLT based on the set of ONU instances of the ONU, upstream communications from the ONU to the OLT. At block 699, the method 600 ends. It will be appreciated that various functions presented herein with respect to FIGS. 1-4 may be incorporated within the context of method 600 of FIG. 6.

It will be appreciated that, although primarily presented with respect to using multiple concurrently active ONU instances of an ONU within the context of a particular type of optical communication network (namely, a particular type of a PON), multiple concurrently active ONU instances of an ONU may be used within the context of various other types of optical communication networks (e.g., other types of PONs or other suitable types of optical communication networks).

Various example embodiments for supporting optical communications for an ONU within a PON based on multiple ONU instances of the ONU may provide various advantages or potential advantages.

For example, various example embodiments for supporting optical communications for an ONU within a PON based on multiple ONU instances of the ONU may provide improved US communications from the ONU to the OLT by instantiating the multiple ONU instances of the ONU to provide multiple communication channels from the ONU to the OLT and then applying bonding over multiple ONU instances of the ONU such that the multiple communication channels from the ONU to the OLT may be used as a single data pipe from the ONU to the OLT. For example, the ONU may be activated multiple times to instantiate the multiple ONU instances, such as by assigning different sets of identifiers to the different ONU instances and assigning different US communication settings to the different ONU instances, and then applying bonding over the different sets of identifiers of the multiple ONU instances such that the multiple communication channels defined based on the different sets of communication settings may be used as a single data pipe from the ONU to the OLT. For example, for the case where two ONU instances are instantiated to be active concurrently to support two US rates from the ONU to the OLT, the ONU is activated twice, once for a higher US rate and once for a lower US rate, with different ONU-IDs and Alloc-IDs being assigned for the two different rates, and then bonding is applied over the ONU-IDs/Alloc-IDs such that the two communication channels may be used as a single data pipe from the ONU to the OLT and the OLT can switch between the two rates by sampling scheduling bursts according the Alloc-IDs corresponding to the desired US rates. It will be appreciated that various example embodiments for using multiple ONU instances of an ONU to support communications from the ONU to the OLT may be applied within the context of various types of optical communication networks based on use of existing control messages (e.g., within PONs based on the G.9804 standard for 50G PON, within PONs based on older PON standards, within PONs based on newer PON standards, within PONs based on various PON standards which may be developed in the future, or the like, as well as various combinations thereof). The bonding may also be applied per traffic flow of the ONU, so that there is a data pipe per traffic flow from the ONU to the OLT.

For example, various example embodiments for supporting optical communications for an ONU within a PON based on multiple ONU instances of the ONU may enable the ONU to switch between multiple US rates supported by the ONU without having to deactivate and reactivate the ONU in order to switch between the US rates. In 2021, the ITU-T standardization body published the G.9804 standard for 50G PON. This standard combines a 50G line rate in the DS with 25G and 12.5G rates in the US. In September 2022, the ITU-T standardization body then approved a 50G US line rate for G.9804. Thus, as mentioned above, the G.9804 standard for 50G PON defines three upstream rates: 12.5G, 25G, and 50G. According to the G.9804 standard, both OLTs and ONUs are allowed to support multiple US rates. For an OLT, the different US line rates may be combined on the same ODN, by using a multi-rate receiver in the OLT, in which the line rate can vary from burst to burst (for example, line rate varies from ONU to ONU). For the ONU, however, no dynamic changing of the US line rate during operation is defined by the G.9804 standard; rather, the ONU would only be able to change the US rate being used (or have its US rate changed) by deactivating and reactivating (i.e., the PON communication link has to be terminated and restarted). Such a deactivation/reactivation process is a slow process that requires at least four PLOAM messages (i.e., at least four control messages), two of which require a corresponding acknowledgment (ACK) message. Various example embodiments for supporting multiple ONU instances for the ONU are configured to enable the ONU to seamlessly switch between US rates without having to perform the deactivation/reactivation process.

For example, various example embodiments for supporting optical communications for an ONU within a PON based on multiple ONU instances of the ONU may provide seamless switching of the US rate of the ONU between multiple US rates in a manner that enables the ONU to support a lower-rate protection mode for US-PON. For example, this may be useful when the ONU is pushed beyond sensitivity by unforeseen circumstances. Such circumstances may include, for instance, fiber pulls or bends, dirty or faulty connectors, excessive heating of the ONU, or the like, as well as various combinations thereof. In the G.9804 standard for 50G PON, for example, due to such circumstances, an ONU that is operating at the 50G sensitivity might no longer be able to receive the 50G signal and, as a result, without support for multiple ONU instances, the ONU would go out of service. The lower-rate protection mode for the ONU enables seamless switching of the ONU to a lower rate which will have an improved sensitivity so that the ONU can remain in service, although at a reduced rate. The reduced rate also may be used to reduce energy consumption, for instance by having less errors that need to be corrected by the LDPC decoder (i.e., less iterations have to be performed by the LDPC decoder).

Figure 7:
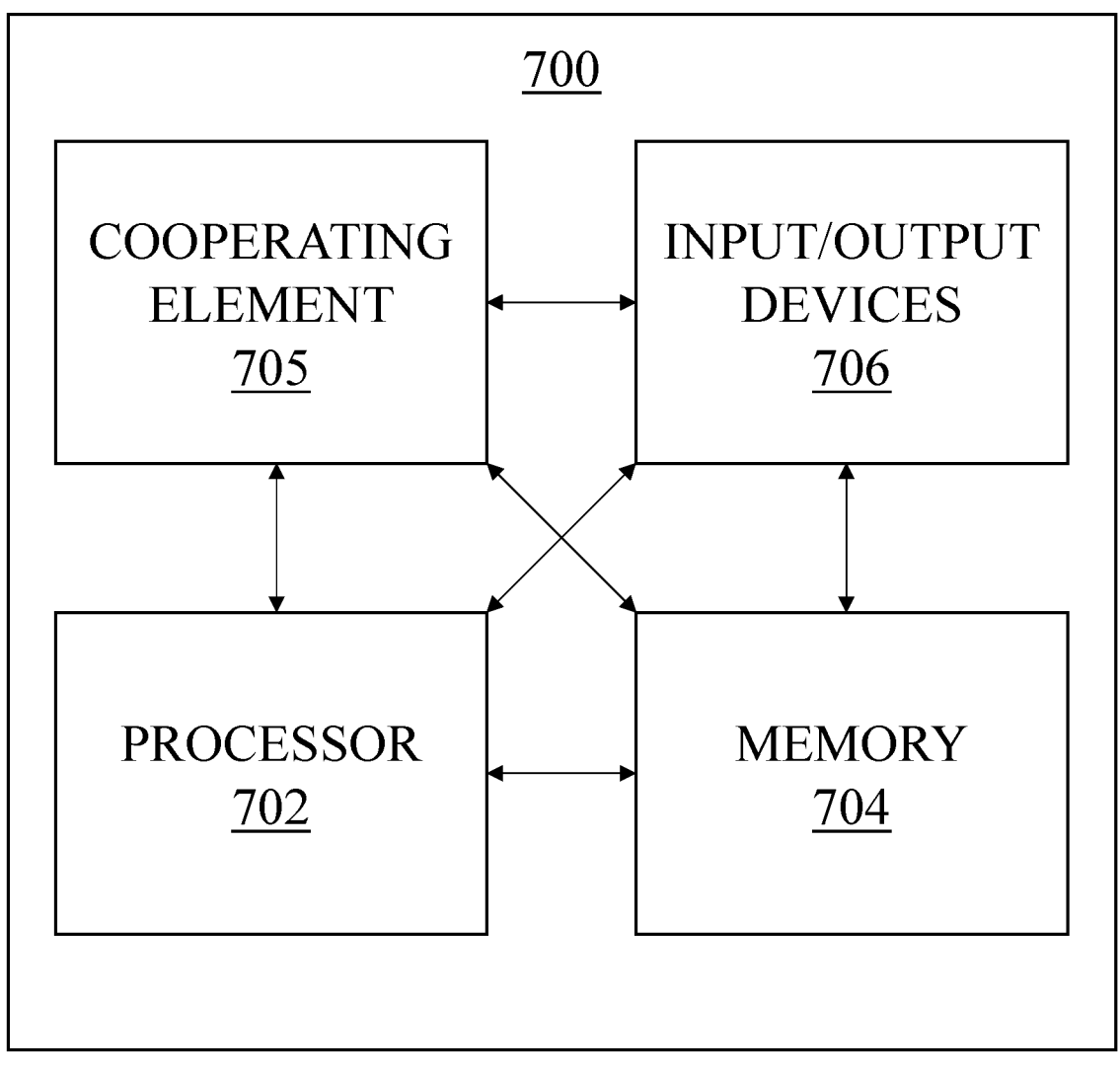
FIG. 7 depicts an example embodiment of a computer suitable for use in performing various functions presented herein.

It will be appreciated that various example embodiments for supporting optical communications for an ONU within a PON based on multiple ONU instances of the ONU may provide various other advantages or potential advantages FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory (RAM), a read-only memory (ROM), or the like). In at least some example embodiments, the computer 700 may include at least one processor and at least one memory storing instructions that, when executed by the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer readable medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, the computer 700 may provide a general architecture and functionality that is suitable for implementing one or more elements presented herein. For example, the computer 700 may provide a general architecture and functionality that is suitable for implementing at least one of a an OLT or a portion thereof, an ONU or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including instructions which, when executed by the at least one processor, cause the apparatus at least to:
support, by an optical network unit (ONU) within a passive optical network, a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, wherein the first set of upstream communication settings includes a first upstream line rate and the second set of upstream communication settings includes a second upstream line rate different than the first upstream line rate; and
support, by the ONU, upstream communications from the ONU to an optical line terminal (OLT) according to different upstream communication settings by switching between ONU instances within the set of ONU instances of the ONU for upstream communications from the ONU to the OLT.

2. The apparatus of claim 1, wherein the first ONU instance has a first ONU identifier associated therewith, wherein the second ONU instance has a second ONU identifier associated therewith.

3. The apparatus of claim 1, wherein
the first set of upstream communication settings includes a first forward error correction code and the second set of upstream communication settings includes a second forward error correction code different than the first forward error correction code.

4. The apparatus of claim 1, wherein, to support the set of ONU instances of the ONU, the instructions, when executed by the at least one processor, cause the apparatus at least to:
instantiate the first ONU instance based on a first set of control messages from the OLT, wherein the first set of control messages indicates a first ONU identifier indicative of the first allocation identifier and indicates the first set of upstream communication settings; and
instantiate the second ONU instance based on a second set of control messages from the OLT, wherein the second set of control messages indicates a second ONU identifier indicative of the second allocation identifier and indicates the second set of upstream communication settings.

5. The apparatus of claim 1, wherein, to support the upstream communications from the ONU to the OLT, the instructions, when executed by the at least one processor, cause the apparatus at least to:
switch between use of the first ONU instance and the second ONU instance from upstream burst to upstream burst.

6. The apparatus of claim 1, wherein, to support the upstream communications from the ONU to the OLT, the instructions, when executed by the at least one processor, cause the apparatus at least to:
receive, by the ONU from the OLT, scheduling information for an upstream burst to be sent by the ONU, wherein the scheduling information is indicative that the first instance of the ONU is to be used for the upstream burst to be sent by the ONU;
generate, by the ONU based on the first set of upstream communication settings of the first instance of the ONU, a burst signal; and
transmit, by the ONU toward the OLT, the burst signal.

7. The apparatus of claim 6, wherein, to generate the burst signal, the instructions, when executed by the at least one processor, cause the apparatus at least to:
receive upstream data from a data queue;
encapsulate the upstream data;
generate a header for the upstream data, where the header includes an ONU identifier of the first instance of the ONU;
associate the header with the upstream data to form an upstream data frame; and
generate the burst signal from the upstream data frame.

8. The apparatus of claim 1, wherein, to support the upstream communications from the ONU to the OLT, the instructions, when executed by the at least one processor, cause the apparatus at least to:
support, by the ONU, bonding of the upstream communication of the first ONU instance and the upstream communication of the second ONU instance.

9. The apparatus of claim 1, wherein the instructions, when executed by the at least one processor, cause the apparatus at least to:
support, by the ONU based on the set of ONU instances of the ONU, downstream communications from the OLT to the ONU.

10. The apparatus of claim 1, wherein the set of ONU instances operates on the same wavelength.

11. A method, comprising:
supporting, by an optical network unit (ONU) within a passive optical network, a set of ONU instances of the ONU including at least a first ONU instance of the ONU and a second ONU instance of the ONU, wherein the ONU instances in the set of ONU instances are active concurrently at the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, wherein the first set of upstream communication settings includes a first upstream line rate and the second set of upstream communication settings includes a second upstream line rate different than the first upstream line rate; and
supporting, by the ONU, upstream communications from the ONU to an optical line terminal (OLT) according to different upstream communication settings by switching between ONU instances within the set of ONU instances of the ONU for upstream communications from the ONU to the OLT.

12. An apparatus, comprising:
at least one processor; and
at least one memory including instructions which, when executed by the at least one processor, cause the apparatus at least to:
support, by an optical line terminal (OLT) for an optical network unit (ONU) within a passive optical network, a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, wherein the first set of upstream communication settings includes a first upstream line rate and the second set of upstream communication settings includes a second upstream line rate different than the first upstream line rate; and
support, by the OLT, upstream communications from the ONU to the OLT according to different upstream communication settings by switching between ONU instances within the set of ONU instances of the ONU for upstream communications from the ONU to the OLT.

13. The apparatus of claim 12, wherein the first ONU instance has a first ONU identifier associated therewith, wherein the second ONU instance has a second ONU identifier associated therewith.

14. The apparatus of claim 12, wherein, to support the set of ONU instances of the ONU, the instructions, when executed by the at least one processor, cause the apparatus at least to:

send, from the OLT toward the ONU, a first set of control messages indicating a first ONU identifier indicative of the first allocation identifier and indicating the first set of upstream communication settings; and send, from the OLT toward the ONU, a second set of control messages indicating a second ONU identifier indicative of the second allocation identifier and indicating the second set of upstream communication settings.

15. The apparatus of claim 12, wherein the instructions, when executed by the at least one processor, cause the apparatus at least to:

allocate a burst grant to the ONU by allocating the burst grant to the first ONU instance or the second ONU instance.

16. The apparatus of claim 12, wherein the instructions, when executed by the at least one processor, cause the apparatus at least to:

determine a condition associated with the ONU; and allocate a burst grant to the ONU by allocating the burst grant to the first ONU instance or the second ONU instance based on the condition associated with the ONU.

17. The apparatus of claim 12, wherein, to support the upstream communications from the ONU to the OLT, the instructions, when executed by the at least one processor, cause the apparatus at least to:

support, by the OLT, bonding of the upstream communication of the first ONU instance and the upstream communication of the second ONU instance such that, for a traffic flow of the ONU, packets of the traffic flow sent based on the first ONU instance and packets of the traffic flow sent based on the second ONU instance are directed to a common reassembly queue.

18. The apparatus of claim 12, wherein the instructions, when executed by the at least one processor, cause the apparatus at least to:

support, by the OLT based on the set of ONU instances of the ONU, downstream communications from the OLT to the ONU.

19. The apparatus of claim 12, wherein the set of ONU instances operates on the same wavelength.

20. A method, comprising:

supporting, by an optical line terminal (OLT) for an optical network unit (ONU) within a passive optical network, a set of ONU instances of the ONU including at least a first ONU instance of the ONU and a second ONU instance of the ONU, wherein the ONU instances in the set of ONU instances are active concurrently for the ONU, wherein the first ONU instance of the ONU has assigned thereto a first allocation identifier and supports a first set of upstream communication settings, wherein the second ONU instance of the ONU has assigned thereto a second allocation identifier different than the first allocation identifier and supports a second set of upstream communication settings different than the first set of upstream communication settings, wherein the first set of upstream communication settings includes a first upstream line rate and the second set of upstream communication settings includes a second upstream line rate different than the first upstream line rate; and supporting, by the OLT, upstream communications from the ONU to the OLT according to different upstream communication settings by switching between ONU instances within the set of ONU instances of the ONU for upstream communications from the ONU to the OLT.

\* \* \* \* \*